United States Patent
Ma

(12) United States Patent (10) Patent No.: US 7,482,839 B2
Ma (45) Date of Patent: Jan. 27, 2009

(54) METHOD AND/OR SYSTEM FOR COMMUNICATION

(75) Inventor: Fan Yung Ma, Singapore (SG)

(73) Assignee: Infineon Technologies AG, Munich (DE)

( * ) Notice: Subject to any disclaimer, the term of this patent is extended or adjusted under 35 U.S.C. 154(b) by 12 days.

(21) Appl. No.: 11/638,323

(22) Filed: Dec. 13, 2006

(65) Prior Publication Data

US 2008/0148080 A1 Jun. 19, 2008

(51) Int. Cl.
*H03K 19/094* (2006.01)
*H03K 19/0175* (2006.01)

(52) U.S. Cl. .............................. 326/86; 326/33; 326/32

(58) Field of Classification Search ............. 326/32–33, 326/82–83, 86, 90
See application file for complete search history.

(56) References Cited

U.S. PATENT DOCUMENTS

| 6,943,588 | B1 * | 9/2005 | Luo et al. ...................... 326/86 |
| 7,023,242 | B2 * | 4/2006 | Brand et al. ................... 326/82 |
| 7,193,443 | B1 * | 3/2007 | Smith et al. ................... 326/83 |
| 2006/0066351 | A1 * | 3/2006 | Lau ............................. 326/86 |

OTHER PUBLICATIONS

Lee, M-J.E., et al., "Low-Power Area-Efficient High-Speed I/O Circuit Techniques," Journal of Solid-State Circuits, vol. 35, No. 11, IEEE, Nov. 2000, pp. 1591-1599.

* cited by examiner

*Primary Examiner*—Anh Q Tran
(74) *Attorney, Agent, or Firm*—Slater & Matsil, L.L.P.

(57) ABSTRACT

An apparatus includes a transmitter, receiver or transceiver to couple to a communication link. An input receives one or more signals for a desired power level of the transmitter, receiver or transceiver. A power supply provides power to the transmitter, receiver or transceiver depending on at least the one or more signals.

10 Claims, 5 Drawing Sheets

METHOD AND/OR SYSTEM FOR COMMUNICATION

TECHNICAL FIELD

The present invention relates to a method and/or system for communication particularly, though not exclusively, to a method and/or system for power management in high speed communication.

BACKGROUND

The power dissipation of communications devices, particularly, high speed communications devices, is an important design consideration. The power dissipation has a direct effect on thermal management costs, e.g., heat sink, cooling and IC packages with lower thermal resistance. In portable devices the power dissipation may also affect the battery life. For example, high speed serial interface data links typically have high power dissipation, with a significant proportion dissipated in the output drivers and receivers.

BRIEF DESCRIPTION OF THE DRAWINGS

Exemplary embodiments will now be described for the sake of example only with reference to the drawings, in which.

DETAILED DESCRIPTION OF ILLUSTRATIVE EMBODIMENTS

Figure 1:
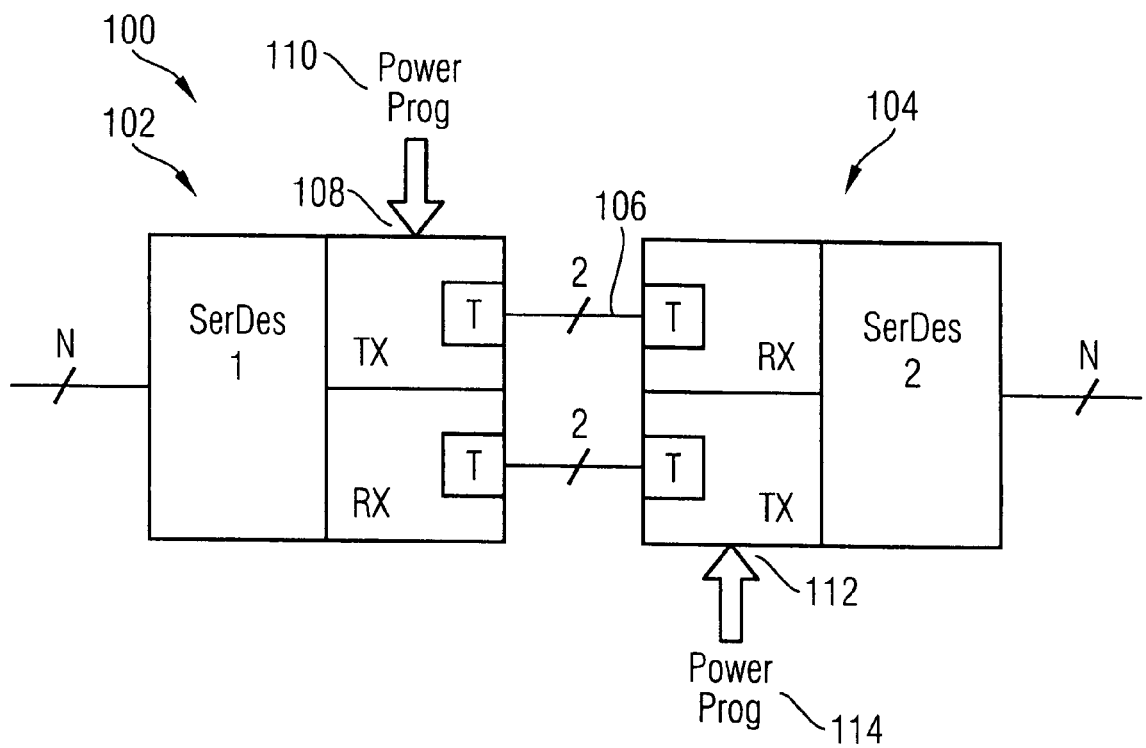
FIG. 1 is a schematic diagram of a system of communication according to an exemplary embodiment.

FIG. 1 shows a communication system 100, according to an exemplary embodiment. The system 100 includes a first transmitter or transceiver 102, a second receiver or transceiver 104 and an application link 106. In operation communication data may be provided to the first transceiver 102 and transmitted over the application link 106 to the second transceiver 104.

The first transceiver 102 is shown in FIG. 1 with an input terminal 108. The input terminal receives a first control signal 110, which determines the output power of the first transceiver 102.

The second transceiver 104 is shown in FIG. 1 with an input terminal 112. The input terminal receives a second control signal 114, which determines the receive power of the second transceiver 104.

Figure 2:
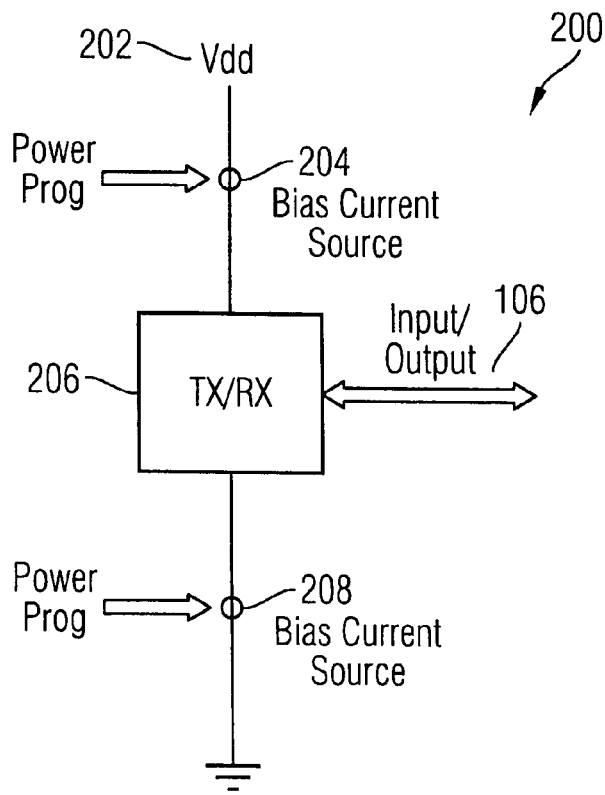
FIG. 2 is a schematic diagram of the transceiver from the system in FIG. 1.

An example of a programmable power transceiver 200 is shown in FIG. 2. The programmable transmitter 200 includes a voltage supply 202, a first bias current source 204, and a transceiver module 206 connected to the application link 106. The first bias current source 204 delivers a first constant current to the transceiver module 206, which can be varied. A second bias current source 208 may deliver a second constant current to the transceiver module 206, which can also be varied.

The circuit gain and drive capability of the transceiver module 206 may be determined by the first bias current source 204 and the second bias current source 208. Therefore by varying the bias current, using the first current source 204 and the second bias current source 208, the output power/receive power may be set without affecting the data rate.

Figure 3:
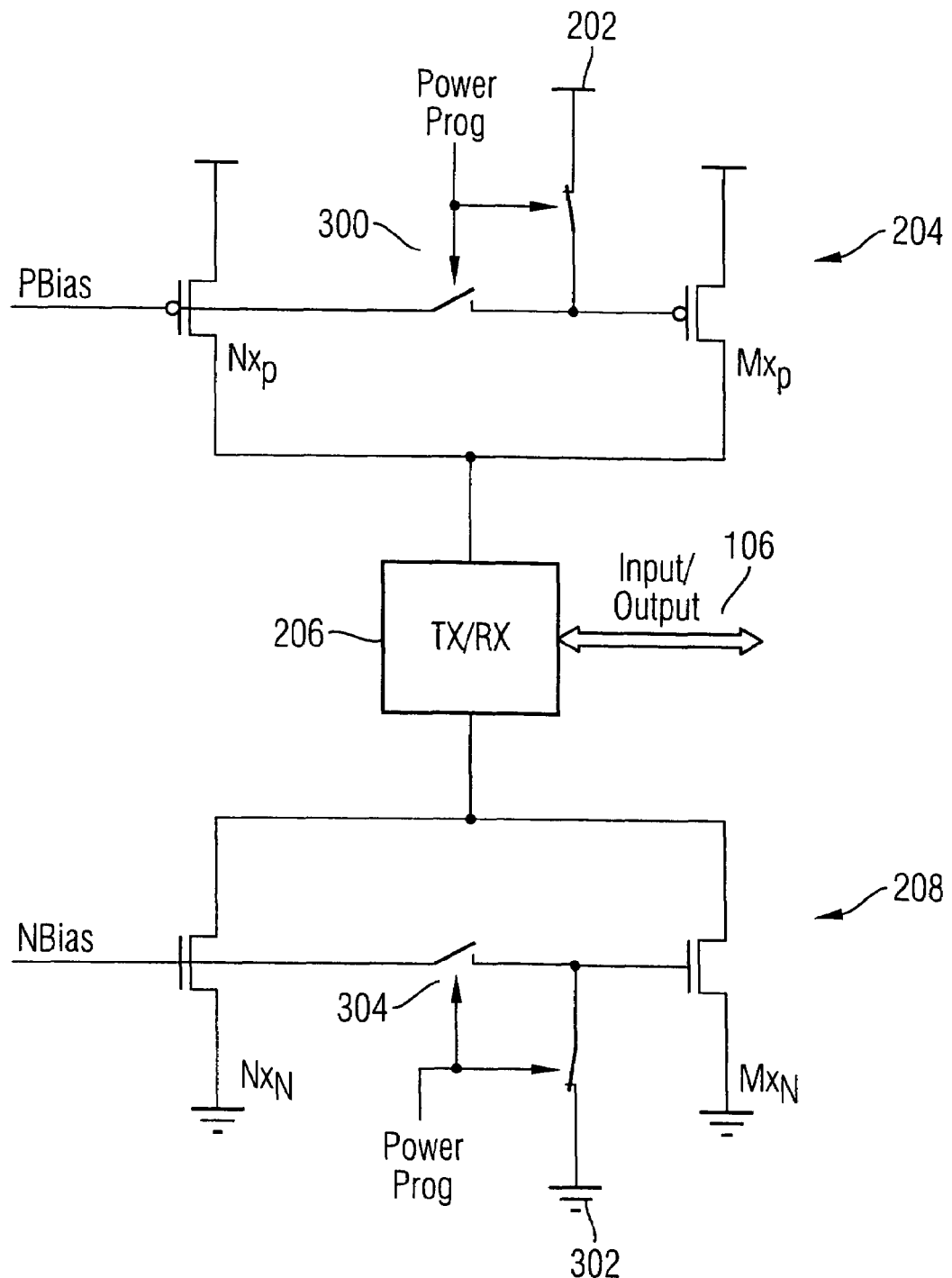
FIG. 3 is a schematic diagram of the current source from the transceiver in FIG. 2.

The first bias current source 204 may be implemented as shown in FIG. 3. The current path from the voltage supply 202 is split into a first PMOS transistor NxP and a second PMOS transistor MxP. (Any number of PMOS transistors and switches may be used depending on the application). The gate terminal of the first PMOS transistor NxP receives bias voltage PBias. The gate terminal of the second PMOS transistor MxP is connected to a first pair of switches 300. The first switches 300 alternatively connect either the bias voltage PBias or the voltage source 202, to the gate terminal of the second PMOS transistor MxP. The state of the pair of switches 300 is determined by the first control signal 110.

The second bias current source 208 may be implemented as shown in FIG. 3. The current path to ground 302 is split into a first NMOS transistor NxN and a second NMOS transistor MxN (any number of NMOS transistors and switches may be used depending on the application). The gate terminal of the first NMOS transistor NxN receives bias voltage NBias. The gate terminal of the second NMOS transistor MxN is connected to a second pair of switches 304. The switches 304 alternatively connect either the bias voltage NBias or ground 302, to the gate terminal of the second NMOS transistor NxN. The state of the second pair of switches 304 may also be determined by the first control signal 110. Depending on the application, the first current source 204 and the second current source 208 may be set for the same or different current levels.

Figure 4:
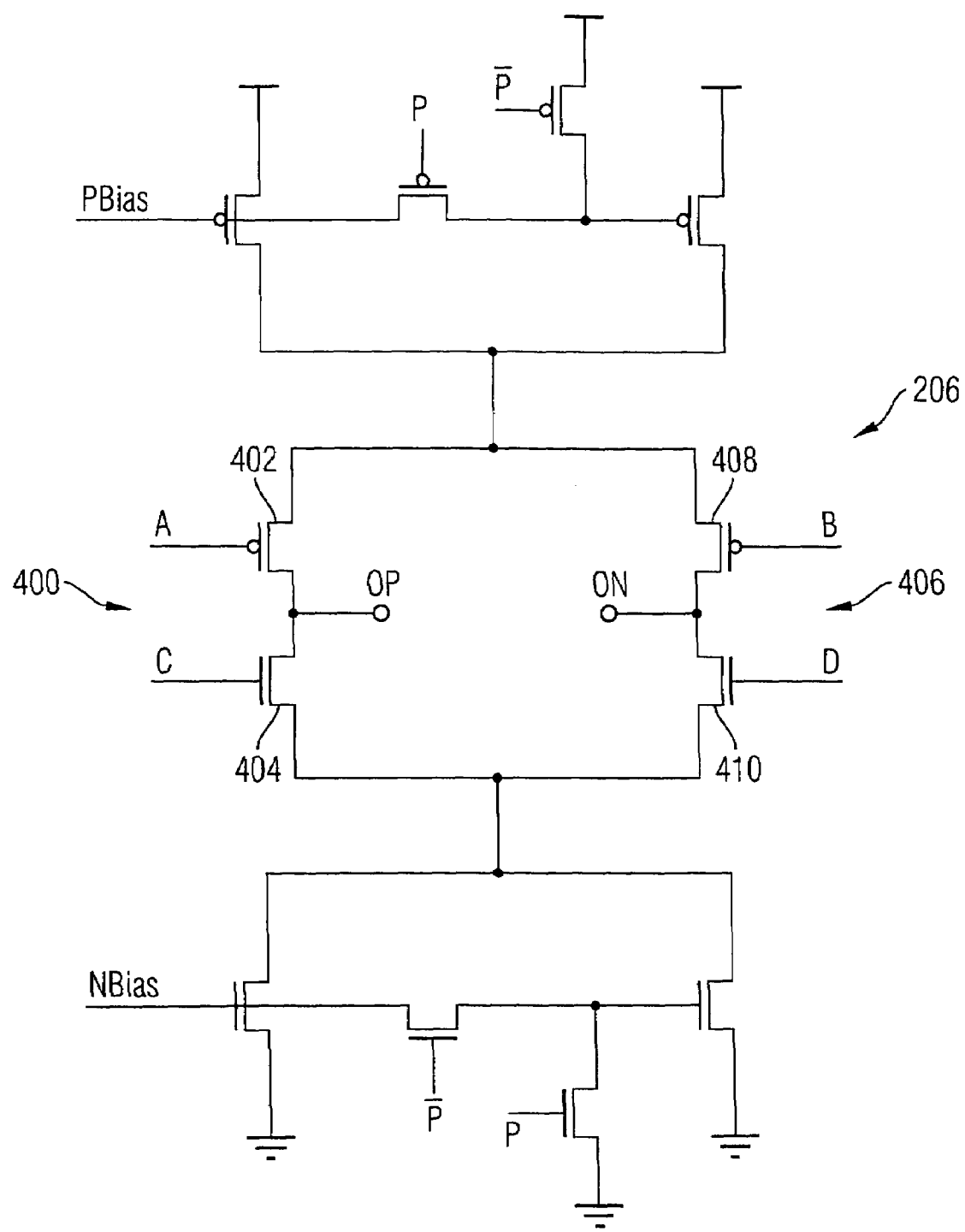
FIG. 4 is a circuit diagram of the transceiver module from the transceiver in FIG. 2.

The application link 106, may be a differential communication link, and the system 100 may be a serial Low Voltage Differential Signaling (LVDS) communication system. In this case the transceiver module 206 may be implemented as shown in FIG. 4. The transceiver module 206 includes two parallel current paths.

A first path 400 includes a first PMOS transistor 402 in series with a first NMOS transistor 404. Data signal A is provided to the gate terminal of the first PMOS transistor 402. Data signal C is provided to the gate terminal of the first NMOS transistor 404. A first output terminal OP, between the first PMOS transistor 402 and the first NMOS transistor 404, is connected to a positive differential line of the application link 106.

A second path 406 includes a second PMOS transistor 408 in series with a second NMOS transistor 410. Data signal B is provided to the gate terminal of the second PMOS transistor 408. Data signal D is provided to the gate terminal of the second NMOS transistor 410. A second output terminal ON, between the second PMOS transistor 408 and the second NMOS transistor 410, is connected to a negative differential line of the application link 106.

The input signals to control the output power and/or the receive power may, for example, be permanently set at manufacturing, or dynamically determined, periodically or in real time.

If the power levels are set at manufacturing, they may be optimized for the application, and may, for example, depend on the maximum data rate, and the distance of the application link 106. Once the power levels have been determined they may be stored in Read Only Memory (ROM) or using fuses. For example, the current level may be determined by the open or closed state of the semiconductor switches in the current source. Some of the switches may be designated as non programmable i.e. always on, and some programmable, i.e., on or off. Thus, the state of the switches is stored, thereby determining the current or power of the transistor and/or receiver.

If the power levels are dynamically determined, they may be optimized for the specific components and the application, and may, for example, depend on the transmission performance, the temperature, the component characteristics, the maximum data rate, and the distance of the application link 106. A processor, for example a Digital Signal Processor (DSP), may monitor environmental variables, and determine optimum power levels by using look up tables, by calculating using an algorithm, or by iteratively determining using feedback.

Figure 5:
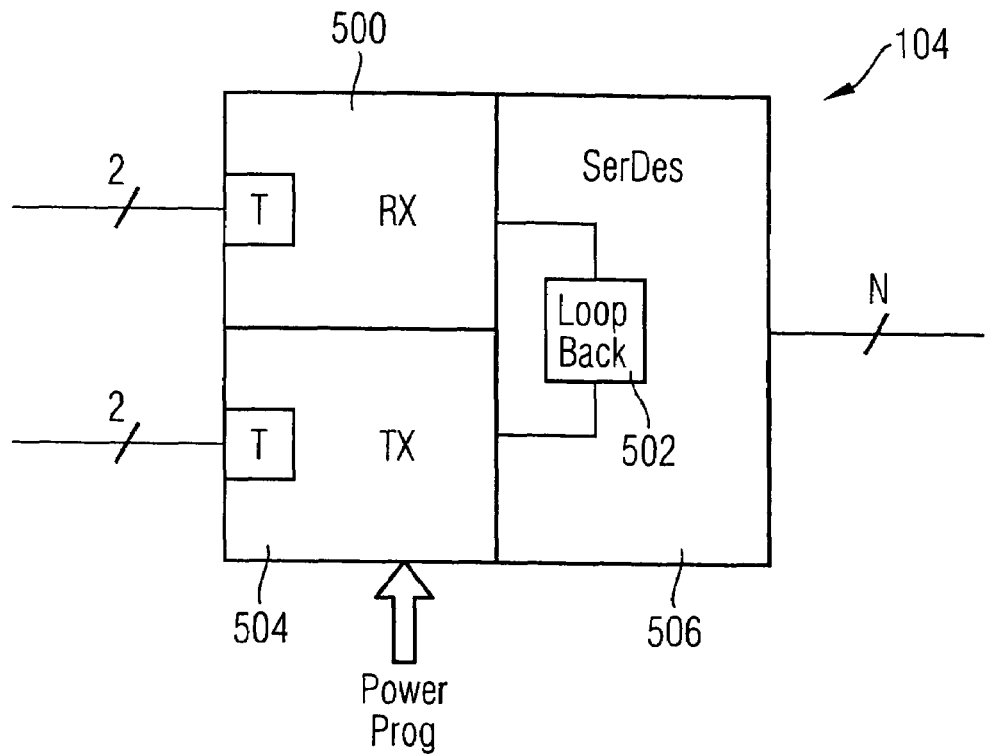
FIG. 5 is a schematic diagram of a loop back transceiver.

If the power levels are iteratively determined using feedback, the second transceiver 104 may be implemented as shown in FIG. 5. In this case the first device under test (DUT) is the first transceiver 102. In order to monitor the transmission performance against output power of the first transceiver 102, the second transceiver 104 includes a receiving module 500, a loop back module 502, a transmitting module 504 and a serializer/deserializer (SerDes) 506. The roles are then reversed and the second device under test (DUT) is the second transceiver 104. Consequently, the first transceiver 102 includes similar components to those shown in FIG. 5.

Figure 6:
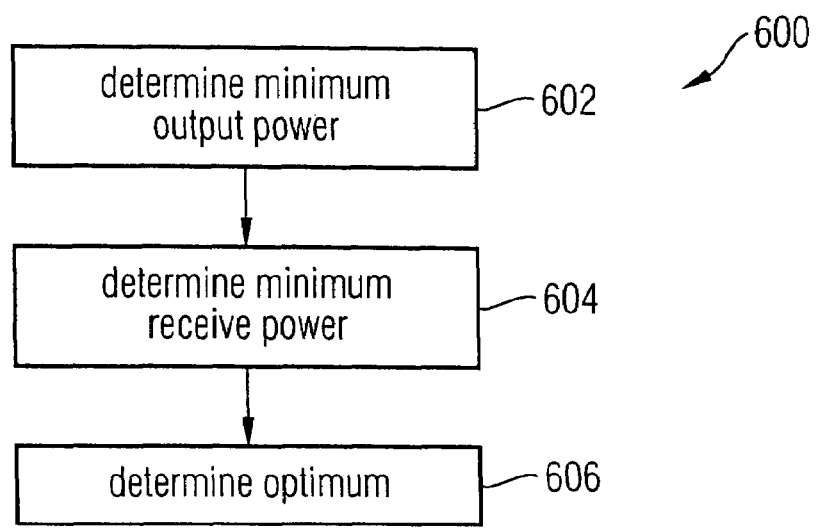
FIG. 6 is a flow diagram of a method of optimizing the output/receive power.

The method 600 of iteratively optimizing the output power T and the receive power R is shown in FIG. 6.

The minimum output power Z of the first transceiver with maximum receive power of the second transceiver is determined by reducing the first control signal 110 until the data transmission performance just meets the specified rating (determine minimum output power 602). This is shown as point Z in FIG. 7.

The minimum receive power Y of the second transceiver with maximum output power of the first transceiver is determined by reducing the second control signal 114 until the data transmission performance just meets the specified rating (determine minimum receive power 604). This is shown as point Y in FIG. 7.

The optimum output/receive power (shown as point X in FIG. 7) can then be found by starting with the minimum output power Z, and decreasing the receive power and increasing the output power, at rated performance, as long as the rate of decrease of receive power is larger than the rate of increase of output power (determine optimum 606). Graphically in FIG. 7, this is when the slope (dR/dT) is less than −1. Alternatively, the optimum output/receive can be found by starting from the minimum receive power Y, and decreasing output power and increasing receive power, at rated performance, as long as the rate of decrease of output power is larger than the rate of increase of receive power. Graphically in FIG. 7, this is when the slope (dR/dT) is greater than −1. Further power reduction can be achieved in the first transceiver 102 if the TX termination resistor is not required for the particular connection distance and data rate.

Figure 7:
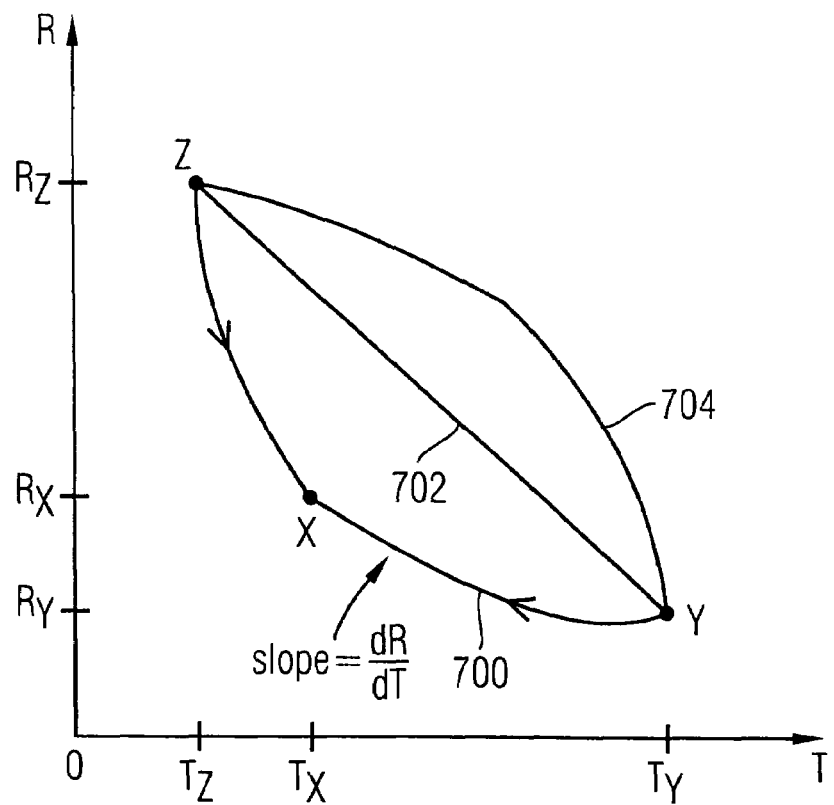
FIG. 7 is a graph of the power curves resulting from the method in FIG. 6.

For example, in FIG. 7 the optimum output/receive power may depend on the shape of the power curve at rated data transmission performance. A first curve 700 has an optimized point X. A second curve 702 (straight line), has an optimized point Y (if the slope is less than −1) or Z (if the slope is greater than −1). A third curve 704 has an optimized point of either Y or Z (just compare the two values).

Figure 8:
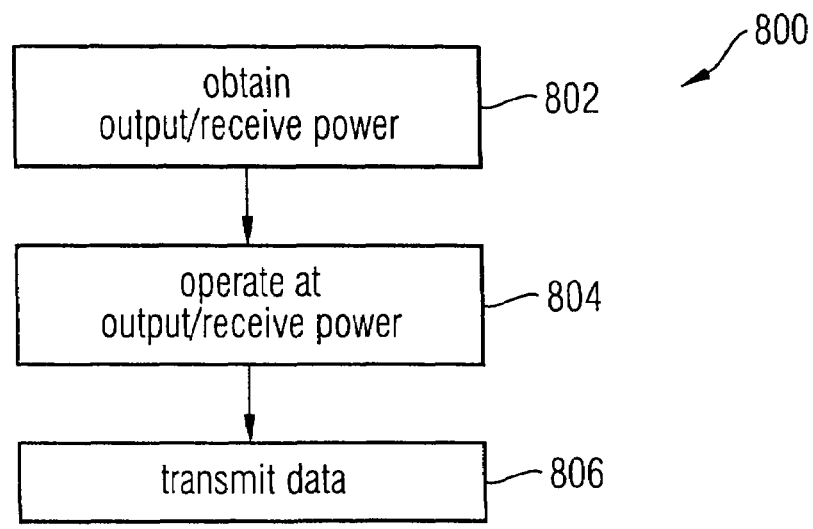
FIG. 8 is a flow diagram of a method of operation.

In use, the communication system 100 may operate according to FIG. 8. The optimum output/receive power settings are obtained, either from storage or dynamically determined, (obtain output/receive power 802). The first transceiver 102 is operated at the optimum output power and the second transceiver 104 is operated at the optimum receive power (operate at output/receive power 804). Then data is transmitted from the first transceiver 102 to the second transceiver 104 via the application link 106 (transmit data 806).

Many variations of the above example embodiments are possible within the scope of the following claims, as will be clear to a skilled reader.

What is claimed is:

1. A system comprising:
    a first transmitter or transceiver to operate at an output power;
    a second receiver or transceiver to operate at a receive power;
    a communication link to connect the first transmitter or transceiver to the second receiver or transceiver;
    a processor to determine the output power and determine receive power based on predetermined instructions; and
    a loopback module configured to monitor transmission performance of the system,
    wherein at least one of the output power and the receive power are optimized for the communication link based on at least the monitored transmission performance.

2. The system of claim 1, further comprising a memory to store the output power and the receive power.

3. The system of claim 2, wherein the memory comprises a Read Only Memory (ROM).

4. The system of claim 1, further comprising one or more fuses or fuse-based circuits to store the output power and the receive power.

5. The system of claim 1, wherein the processor is configured to dynamically determine the output power and the receive power.

6. The system of claim 5, wherein the processor is configured to monitor transmission performance and to iteratively optimize the output power and the receive power to achieve a predetermined data transmission performance.

7. A method of optimizing the power for a first transmitter or transceiver connected via a communication link to a second receiver or transceiver, the method comprising:
    monitoring transmission performance at the first transmitter or transceiver and the second receiver or transceiver; and
    iteratively optimizing the output power for the first transmitter or transceiver and the receive power for the second receiver or transceiver, to achieve a predetermined data transmission performance, wherein the iteratively optimizing comprises
        determining a power curve by adjusting the output power for the first transmitter or transceiver and the receive power for the second receiver or transceiver over a range of transmit powers while keeping the transmission performance at the predetermined transmission performance based on the monitoring,
        after adjusting the output power and receive power over the range of transmit powers, selecting a point on the power curve where combination of output power for the first transmitter or transceiver and the receive power for the second receiver or transceiver is minimum for the predetermined transmission performance, and setting the output power for the first transmitter or transceiver and the receive power for the second receiver or transceiver at values that correspond to the selected point.

8. A system comprising:

a transmitter to operate at an output power;

a receiver to operate at a receive power;

a communication link to connect the transmitter the receiver; and a processor to determine the output power and determine the receive power based on predetermined instructions, wherein at least one of the output power and the receive power are optimized for the communication link, the processor is configured to dynamically determine the output power and the receive power, monitor transmission performance, and iteratively optimize the output power and the receive power to achieve a predetermined data transmission performance by adjusting currents in the transmitter and the receiver.

9. The method of claim 7, further comprising:

determining a minimum output power of the first transmitter or transceiver, wherein determining comprises setting the receive power at a maximum receive power value, setting the output power at a maximum output power value, after setting the output power and the receive power, reducing the output power until the data transmission performance just meets the predetermined data performance, wherein the minimum output power comprises the output power when the data transmission performance just meets the predetermined data performance; and determining a minimum receive power of the second receiver or transceiver, wherein determining comprises setting the receive power at the maximum receive power value, setting the output power at the maximum output value, and after setting the output power and the receive power, reducing the receive power until the data transmission performance just meets the predetermined data performance, wherein the minimum receive power comprises the receive power when the data transmission performance just meets the predetermined data performance.

10. The method of claim 9, wherein the range of transmit powers comprises a range of transmit powers between the maximum output power value and the minimum output power of the first transmitter or transceiver.

* * * * *

UNITED STATES PATENT AND TRADEMARK OFFICE
CERTIFICATE OF CORRECTION

PATENT NO. : 7,482,839 B2 Page 1 of 1
APPLICATION NO. : 11/638323
DATED : January 27, 2009
INVENTOR(S) : Ma It is certified that error appears in the above-identified patent and that said Letters Patent is hereby corrected as shown below:

In Col. 5, line 8, after transmitter insert --to--.

Signed and Sealed this

Seventeenth Day of March, 2009

JOHN DOLL
*Acting Director of the United States Patent and Trademark Office*